United States Patent [19]

Berezin et al.

[11] 3,883,593

[45] May 13, 1975

[54] 10-NITRO-5H-DIBENZO(A,D)CYCLOHEPT-EN-5-ONES AND SELECTED DERIVATIVES

[75] Inventors: Gilbert H. Berezin, West Chester, Pa.; George Albert Boswell, Jr., Wilmington, Del.

[73] Assignee: E. I. du Pont de Nemours & Company, Wilmington, Del.

[22] Filed: Feb. 11, 1974

[21] Appl. No.: 441,658

[52] U.S. Cl. ...... 260/590; 260/465 D; 260/475 FR; 260/515 A; 260/515 M; 260/562 R; 260/520; 260/562 B; 260/645; 260/607 A; 260/611 F; 424/331

[51] Int. Cl... C07c 49/76; C07c 49/80; C07c 49/82

[58] Field of Search .................................. 260/590

[56] References Cited
UNITED STATES PATENTS
3,551,498  12/1970  Tristram et al. .................... 260/590

*Primary Examiner*—D. Horwitz

[57] ABSTRACT

New compounds with the 5H-dibenzo[*a,d*]cycloheptyl nucleus, which have a nitro group in the 11-position and oxo(keto) or dichloro groups in the 5-position and optional substituents on benzenoid carbon are useful as fungicides.

6 Claims, No Drawings

3,883,593

10-NITRO-5H-DIBENZO(A,D)CYCLOHEPTEN-5-ONES AND SELECTED DERIVATIVES

BACKGROUND OF THE INVENTION

1. Field of the Invention

This invention relates to dibenzocycloheptenones having a nitro group on the 7-membered ring, derivatives thereof, and the corresponding heptanes having nitro and iodine on adjacent carbons of the 7-membered ring. The compounds have fungicidal activity.

2. Description of the Prior Art

Considerable effort has been made in the synthesis of neuropsychotropically active dibenzocycloheptyl compounds, but the only nitro derivative reported has been on a benzenoid ring, i.e., 10,11-dihydro-3-nitro-5H-dibenz [a,d]cyclohepten-5-one in Belgian Pat. No. 773,649 and U.S. Pat. No. 3,551,498. The introduction of nitro groups on nonbenzenoid carbon and properties of the resulting compounds are known to be different from those of aromatic nitro compounds.

DESCRIPTION OF THE INVENTION

The invention comprises a fungicidal compound having a formula selected from the group consisting of A. 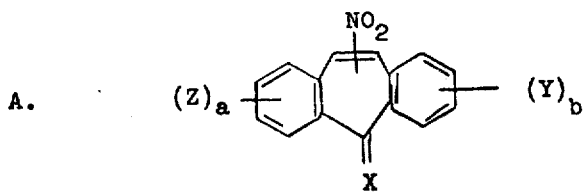

and

B. 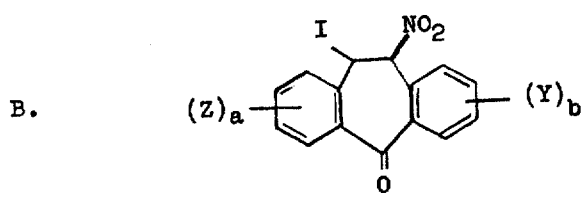

wherein
X is O or $Cl_2$;
Y and Z independently are halogen, cyano, nitro, COOH, $CF_3$, lower alkyl, lower alkoxy, lower alkylsulfonyl, sulfonamido, sulfonamido of lower alkylamine, lower carbalkoxy, carbonamido of lower alkanoic acid and carbonamido of lower perfluoro alkanoic acid; and
a and b independently are 0–2, their sum being no greater than 2. "Lower" means 1–6 carbon atoms.

The 5-H-dibenzo[a,d]cycloheptenes and 5-H-dibenz[a,d]cycloheptanes can be represented by the basic structure having the numbering as follows:

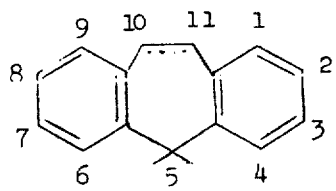

Specifically included in the invention are the 10 (or 11) nitro-cycloheptenes represented as

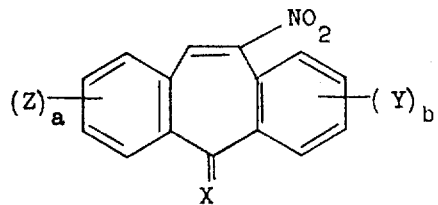

and the 10-iodo-11-nitrocycloheptanes which can be represented as

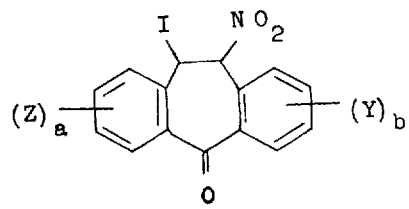

with the variables as listed above.

The compounds can be prepared by reaction of a 5H-dibenzo[a,d]cyclohepten-5-one with nitrosyl fluoride followed by treatment with aqueous base. The new compounds can also be prepared by reacting the cycloheptenone with nitrogen dioxide and iodine ($NO_2I$) to give the corresponding 10-nitro-11-iodocycloheptane, which in the presence of an acid acceptor such as tertiary amine or a base, usually at 0°–50°C, yields the 10-nitro-5H-dibenzo[a,d]cyclohepten5-one. The ketone compound can be reacted with phosphorus pentachloride to give the 5,5-dichloro derivative.

SPECIFIC EMBODIMENTS OF THE INVENTION

In the following illustrative examples all parts are by weight and all temperatures are in degrees Centigrade unless otherwise specified.

EXAMPLE 1

10-Nitro-5H-dibenzo[a,d]cyclohepten-5-one

X = O a = b = 0

To a solution of 40 g (0.19 mole) of 5H-dibenzo[a,d]cyclohepten-5-one in 300 ml of methylene chloride stirred at 0° in a polyethylene vessel was added 37 g of (0.75 mole) nitrosyl fluoride during an 8 hour period. The solution was sealed in the polyethylene vessel and allowed to come to room temperature overnight. At the end of that period the solution was cooled to 0° and an additional 8 g (0.16 mole) of nitrosyl fluoride was added. The vessel was again sealed and allowed to come to room temperature and stand for 8 days. The dark solution was extracted with saturated sodium bicarbonate solution until the washings were slightly basic. The organic phase was dried with anhydrous magnesium sulfate, filtered and evaporated at reduced pressure. The residual semicrystalline material was recystallized from ethanol to give 22 g of 10-nitro-5H-dibenzo[a,d]cyclohepten-5-one, mp 164°–166°.

Anal. Calcd. for $C_{15}H_9NO_3$: C, 71.71; H, 3.61; N, 5.57. Found: C, 72.14; H, 3.68; N, 5.17.

EXAMPLE 2

Preparation of
10-iodo-11-nitro-5H-dibenzo[a,d]cyclohepten-5-one

X = O a = b = 0

To a solution of 100 g (0.49 mole) of 5H-dibenzo[a,d]cyclohepten-5-one and 80 g (0.31 mole) of iodine in 400 ml of methylene chloride and 300 ml of ether was added 28 g (0.31 mole) of nitrogen dioxide in a stream of nitrogen at 0°. The nitrogen flow was adjusted so as to add the nitrogen dioxide over a 1 hour period. Stirring at 0° was continued for an additional 2 hours. At the end of this period the reaction was allowed to come to room temperature and stirring was continued overnight. The solution was cooled to 0° and the precipitated solid was filtered and washed with three 100 ml portions of ether to give 90 g of crude 10-iodo-11-nitro-5H-dibenzo[a,d]cyclohepten-5-one. Recrystallization from methanol gave 10-iodo-11-nitro-5H-dibenzo[a,d]cyclohepten-5-one, mp 131°–131.5° Dec.

Anal. Calcd. for $C_{15}H_{10}NO_3I$: C, 47.53; H, 2.66; N, 3.70. Found: C, 47.50; H, 2.75; N, 3.21.

Using the procedure described in Example 2 with the indicated starting materials, there are obtained products as follows:

methylene chloride there was added 30 g (0.38 mole) of pyridine with stirring at 0°. The solution was stirred at 20° for an additional 4 hours. At the end of this period the solution was washed with 300 ml of water, 300 ml of 5% hydrochloric acid and 300 ml of sodium thiosulfate solution. The organic phase was dried over anhydrous magnesium sulfate filtered and evaporated at reduced pressure. The residual solid was recrystallized from ethanol to give 25 g of 10-nitro-5H-dibenzo[a,d]-cyclohepten-5-one. This product was identical to 10-nitro-5H-dibenzo[a,d]cyclohepten-5-one prepared in Example 1.

EXAMPLE 4

3-Bromo-10-nitro-5H-dibenzo[a,d,]cyclohepten-5-one and 3-bromo-11-nitro-5H-dibenzo[a,d]cyclohepten-5-one

X = O a = 0 b = 1

Y = Br

To a well stirred solution of 20 g (0.070 mole) of 3-bromo-5H-dibenzo[a,d]cyclohepten-5-one and 19 g (0.075 g atom) of iodine in 150 ml methylene chloride and 150 ml of ether cooled to 0°, there was added 7 g (0.076 mole) of nitrogen dioxide in a stream of nitrogen. The nitrogen flow was adjusted so as to add the nitrogen dioxide over a 30 minute period. Stirring at 0° was continued for an additional 2 hours. At the end of this period the reaction was allowed to come to room

| Starting Material | Product |
|---|---|
| 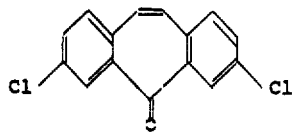 | 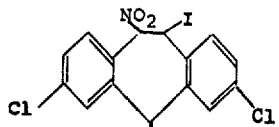 |
| 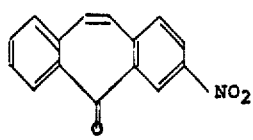 | 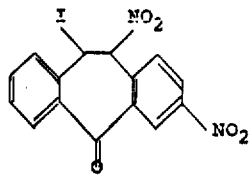 |
| 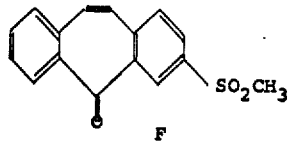 | 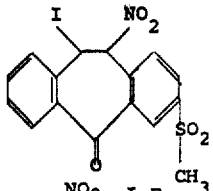 |
| 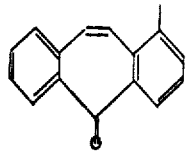 | 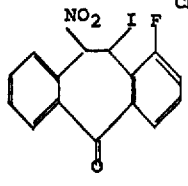 |

EXAMPLE 3

10-Nitro-5H-dibenzo[a,d]cyclohepten-5-one

To a solution of 45 g (0.12 mole) of 11-iodo- 10-nitro-5H-dibenzo[a,d]cyclohepten-5-one in 500 ml of temperature and stirring was continued overnight. The solution was decanted and washed with saturated sodium thiosulfate solution and the organic phase was dried with anhydrous magnesium sulfate. The organic phase was filtered and evaporated at reduced pressure to give a mixture of 3-bromo-10-iodo-11nitro-5H-dibenzo[a,d]cyclohepten-5-one and 3-bromo-11-iodo- 10-nitro-5H-dibenzocyclohepten-5-one.

To a solution of the above mixture in 300 ml of methylene chloride there was added 15 ml of triethylamine at 0°C. The solution was stirred at 20° for 4 hours. At the end of this period the reaction mixture was diluted with 500 ml of methylene chloride and the organic phase was washed with 300 ml of 5% hydrochloric acid solution, 300 ml of saturated sodium thiosulfate solution and 300 ml of water. The organic phase was dried with anhydrous magnesium sulfate and filtered. The filtrate was evaporated at reduced pressure to give a residual solid. The solid was recrystallized from ethyl acetate to give 11 g of a mixture of 3-bromo-10-nitro-5H-dibenzo[a,d]-cyclohepten-5-one and 3-bromo-11-nitro-5H-dibenzo[a,d]cyclohepten-5-one, mp 160°–165°.

Anal. Calcd. for $C_{15}H_8$ $BrNO_3$: C, 54.72; H, 2.43; N, 4.23. Found: C, 55.71; H, 2.69; N, 3.47.

Using the procedure described in Example 4 with the indicated starting materials there are obtained products as follows:

| Starting Material | Product (Mixture of Isomers) |
|---|---|
| 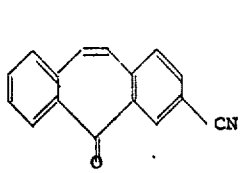 | 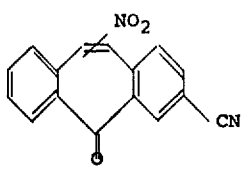 |
| 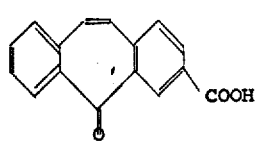 | 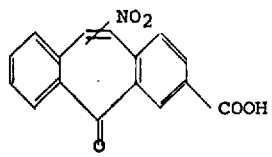 |
| 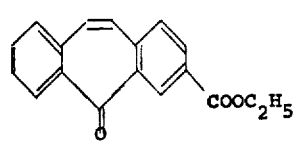 | 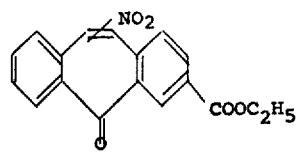 |
| 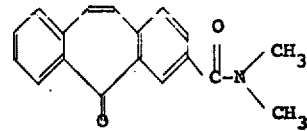 | 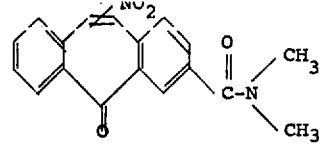 |
| 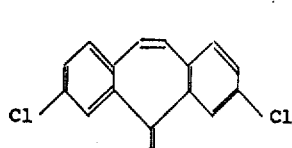 | 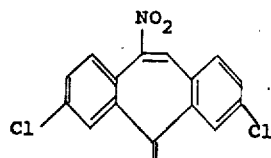 |
| 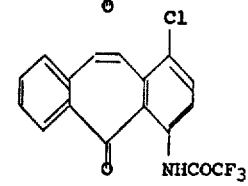 | 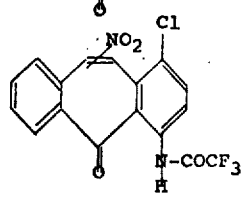 |
| 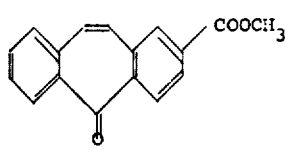 | 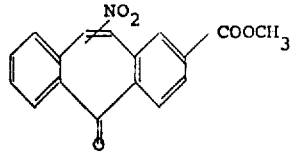 |

-Continued
| Starting Material | Product (Mixture of Isomers) |
|---|---|
| 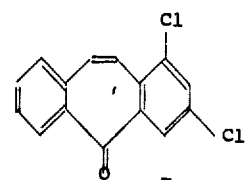 | 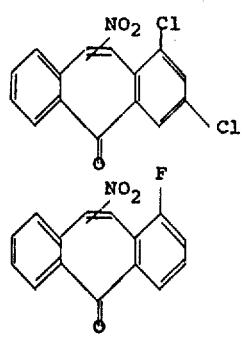 |
| 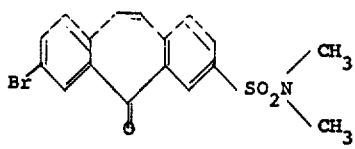 | 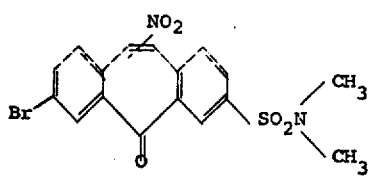 |
| 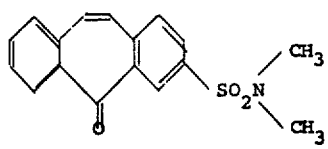 | 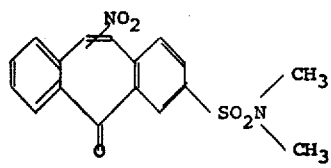 |
| 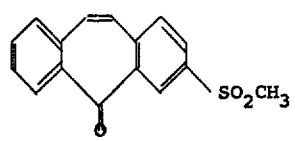 | 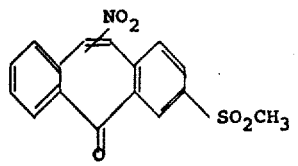 |
| 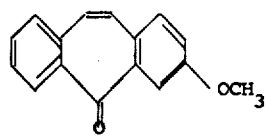 | 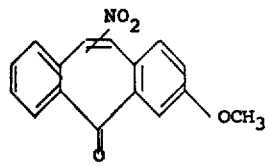 |
| 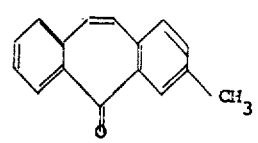 | 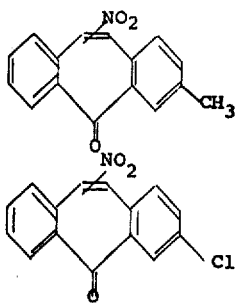 |
| 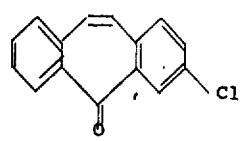 | 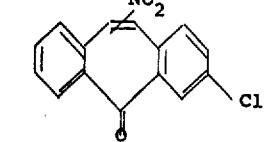 |
| 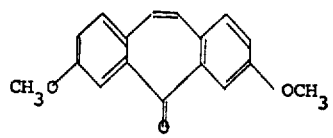 | 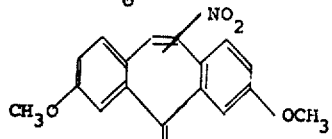 |
| 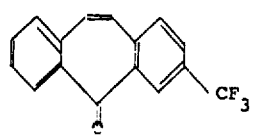 | 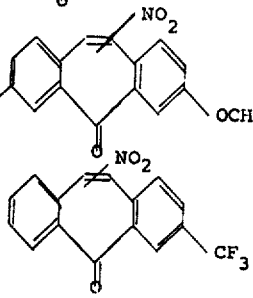 |

EXAMPLE 5

5,5-dichloro-10-nitro-5H-dibenzo[a,d]cycloheptene $X = Cl_2$ $a = b = 0$

To 50 ml of phosphorous oxychloride there was added 11 g (0.044 mole) of 10-nitro-5H-dibenzo[a,d-]cyclohepten-5-one and 11.5 g (0.055 mole) of phosphorus pentachloride. The dark red solution was heated gently at reflux for 1.5 hours and at 100° for an additional 1 hour. At the end of this period 100 ml of toluene was added and stirring was continued for 1 hour at 90°. At the end of this period the solvent was removed at reduced pressure. The dark residue crystallized and was recrystallized twice from cyclohexane to give 10.5 g, mp 133°–135°. Hydrolysis of a small sample with aqueous ethyl acetate give 10-nitro-5H-dibenzo[a,d]cyclohepten-5-one. This indicates no rearrangement took place during the chlorination.

Anal. Calcd. for $C_{15}H_9NO_2Cl_2$: C, 58.85; H, 2.96; N, 4.58; Cl, 23.17. Found: C, 58.65; H, 3.04; N, 4.05; Cl, 23.26.

Using the procedure described above in Example 5 with the indicated starting materials, there are obtained the following products:

| Starting Material | Product |
|---|---|
| 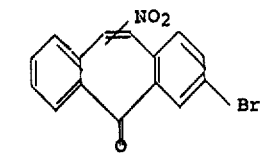 | 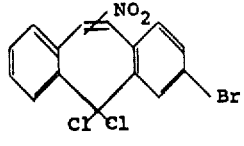 |
| 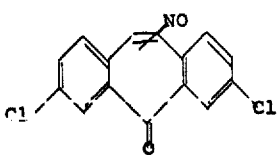 | 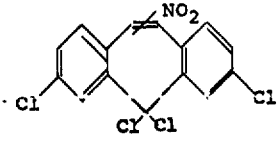 |
| 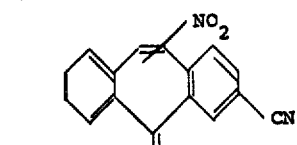 | 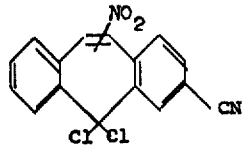 |
| 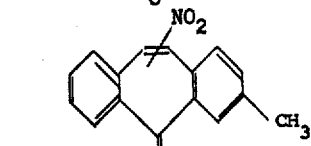 | 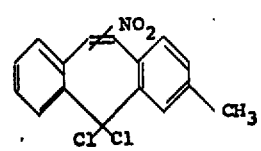 |
| 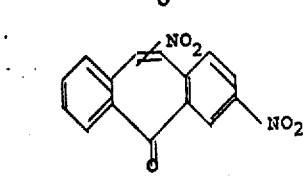 | 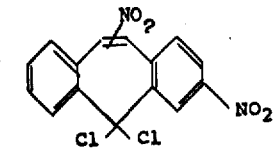 |
| 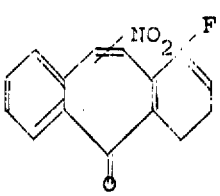 | 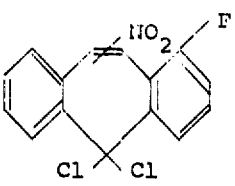 |
| 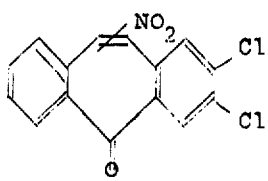 | 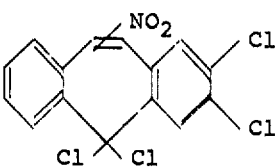 |

The compounds of the invention protect plants against fungi. Plant protectant compositions containing the compounds can also contain surface-active agents (e.g., in 0.1 to 10% by weight of the composition) inert liquid or solid diluents, and optionally insecticides, nematocides, corrosion inhibitors and the like. Generally the cycloheptyl compounds constitute 1-15% of the weight of the antifungal composition. The composition can be diluted for application as spray or dust to the plant or on the soil suitably at a rate of 0.1 to 50 Kg/Ha.

The compounds can also be applied to seeds subject to fungal attack. The exact amount used depends on the fungus, type of soil, method of application (i.e., in row or mixed with all soil, spray on plant, etc.).

The following tests demonstrate the utility of these compounds as antifungal agents:

Apple seedlings, trained to a single shoot, were sprayed uniformly to the point of run-off with distilled water containing the test compound in a concentration of 100 ppm. Plants were inoculated the next day with a conidial suspension of apple scab, *Venturia inaequalis*, and incubated at 20°C. in saturated humidity for 30 hours. Disease ratings were made, after 12 days in the greenhouse, by a visual estimate of the percent of the inoculated leaf area that was diseased. A summary of readings, based on four replicate plants for each treatment, shows the compounds of Examples 1, 2, 4 and 5 gave 100% control of the disease.

Two-week-old cucumber plants were sprayed uniformly to the point of run-off with distilled water containing the test chemicals in a concentration of 100 ppm. The following day all plants were dust inoculated with powdery mildew (*Erysiphe cichoracerum*) conidia. After 8 days of incubation in the greenhouse, disease ratings were made by a visual estimate of the percentage of the inoculated leaf area that was diseased. This is a preventive test because the chemicals were applied prior to inoculation. A summary of readings, based on four replicate plants for each treatment, shows the compound of Example 1 gave 60% control of the disease; Example 2 gave 90% control; and Example 5 gave 90% control.

The test for prevention of tomato late blight was conducted with an aqueous dispersion at a concentration of 100 ppm. The dispersions were sprayed to the point of run-off on potted tomato plants and allowed to dry. Both treated and untreated plants were inoculated with a spore suspension of *phytophthora infestans* and incubated for a day in a saturated humidity chamber. After 5 days of additional incubation in the greenhouse, all of the untreated tomatoes were dead because of late blight disease. The compound of Example 1 gave 70% control of the blight while that of Example 4 gave 40% control at this concentration.

We claim:

1. A fungicidal compound having a formula selected from the group consisting of:

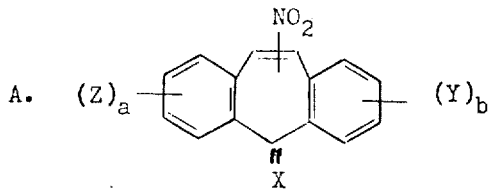

and

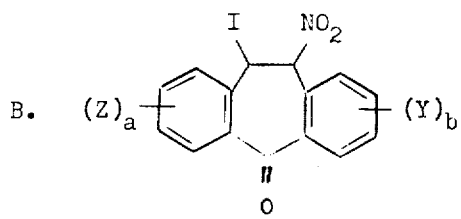

wherein

X is O;

Y and Z independently are halogen, nitro, $CF_3$, lower alkyl, lower alkoxy, lower alkylsulfonyl, and $a$ and $b$ independently are 0-2, their sum being no greater than 2.

2. A compound according to formula A of claim 1 wherein X = oxygen, $a = b = 0$; 10-nitro-5H-dibenzo[$a,d$]-cyclohepten-5-one.

3. A compound according to formula A of claim 1 wherein X = oxygen, Y = Br, $a = 0, b = 1$; 3-bromo-10-nitro-5H-dibenzo[$a,d$]cyclohepten-5-one.

4. A compound according to formula A of claim 1 wherein X = oxygen, Y = Br, $a = 0, b = 1$; 3-bromo-11-nitro-5H-dibenzo[$a,d$]cyclohepten-5-one.

5. A compound according to formula B of claim 1 wherein $a = b = 0$; 10-iodo-11-nitro-5H-dibenzo[$a,d$]cyclohepten-5-one.

6. The process of reacting a 5H-dibenzo[$a,d$]-cyclohepten-5-one with nitrogen dioxide and iodine at a temperature of 0°–50°C. in the presence of an acid acceptor and recovering a 10-nitro-5H-dibenzo[$a,d$]cyclohepten-5-one.

* * * * *